United States Patent [19]

Saxena et al.

[11] 3,917,599

[45] Nov. 4, 1975

[54] 2-SUBSTITUTED-1,2,3,4,6,7,12,12A-OCTAHYDROPYRAZINO(2',1':6,1-)PYRIDO(3,4-B)INDOLES

[75] Inventors: Anil Kumar Saxena, Nainital; Padam Chand Jain; Gurbuksh Singh, both of Lucknow; Prithvi Raj Dua; Rikhab Chand Srimal, both of Lucknow; Bhola Nath Dhawan; Nitya Anand, both of Lucknow, all of India

[73] Assignee: Council of Scientific and Industrial Research, New Delhi, India

[22] Filed: Mar. 30, 1973

[21] Appl. No.: 346,468

[52] U.S. Cl.......... 260/268 PC; 260/295 C; 424/250
[51] Int. Cl.²..................................... C07D 295/10
[58] Field of Search............... 260/268 PC, 268 DK

[56] References Cited
UNITED STATES PATENTS

| | | | |
|---|---|---|---|
| 3,151,116 | 9/1964 | deStevens et al. | 260/268 PC |
| 3,468,890 | 9/1969 | Archer | 260/268 PC |
| 3,644,384 | 2/1972 | Schulenberg | 260/268 PC |
| 3,717,638 | 2/1973 | Schulenberg | 260/268 PC |

OTHER PUBLICATIONS
Schulenberg et al., Journal of Medicinal Chemistry (1970), 13(1) 145 Eng.

Primary Examiner—Raymond V. Rush
Assistant Examiner—Jose Tovar
Attorney, Agent, or Firm—Theodore Post; C. Kenneth Bjork

[57] ABSTRACT

Pharmacologically active 2-substituted-1,2,3,4,-6,7,12,12A-octahydropyrazino[2',1':6,1]pyrido[3,4-b]indoles corresponding to the formula

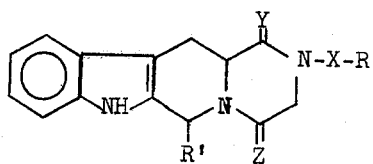

wherein X is a straight or branched chain alkylene group optionally interrupted by a CO or a CHOH group, R is hydrogen, lower alkyl, aryl, aryloxy, cyano, carboxy, carbalkoxy, dialkylamino, benzodioxanyl or 4-pyridyl, and X and R together may be hydrogen; Y and Z independently are $H_2$ or an oxygen atom; and R' is hydrogen or a lower alkyl group. The compounds of the invention have tranquilizing and hypotensive activity. The inventive compounds are prepared by reacting an alkyl 1,2,3,4-tetrahydro-9H-pyrido[3,4-b]indole-3-carboxylate starting material with ethyleneimine to give a 1-oxo-1,2,3,4,6,7,12,12a-octahydropyrazino[2',1':6,1]-pyrido[3,4-b]indole in which substituents are then introduced at position 2 by a variety of methods, before or after having hydrogenated the oxo group at position 1. Alternatively, an alkyl 2-chloro-acetyl-1,2,3,4-tetrahydro-9H-pyrido[3,4-b]indole-3-carboxylate and a primary amine H₂NXR are reacted to give a 1,4-dioxo-1,2,3,4,6,7,12,12a-octahydropyrazino[2',1':6,1-]pyrido[3,4-b]indole, in which substituents are then introduced before or after having hydrogenated the two oxo groups at positions 1 and 4.

8 Claims, No Drawings

2-SUBSTITUTED-1,2,3,4,6,7,12,12A-OCTAHYDROPYRAZINO(2',1':6,1)PYRIDO(3,4-B)INDOLES

SUMMARY OF THE INVENTION

This invention is concerned with novel pharmacologically-active substances. More particularly, this invention relates to 2-substituted-1,2,3,4,6,7,12,12a-octahydropyrazino[2',1':6,1]pyrido[3,4-b]indoles represented by the formula

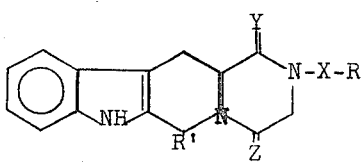

wherein X represents a straight or branched chain alkylene group optionally interrupted by a Co or a CHOH group, R represents hydrogen, lower alkyl, aryl, aryloxy, cyano, carboxy, carbalkoxy, dialkylamino, benzodioxanyl or 4-pyridyl, and X and R together may be hydrogen; Y and Z independently represent $H_2$ or an oxygen atom; and R' represents hydrogen or a lower alkyl group.

In the specification and claims, the term "a straight or branched chain alkylene group" designates an alkylene group containing from 1 to 6 carbon atoms such as, for example, an ethylene, propylene, butylene, amylene or a hexylene group, in which one of the methylene groups may be replaced by a carbonyl or a hydroxymethylene group, such as, for example, $CH_2CH_2CO$, $CH_2CH_2CH_2CHOH$, $CH_2CO$, $CH_2CH_2CHOH$ and so on. The terms "lower alkyl" and "lower alkoxy" designate a straight or branched chain alkyl group, containing from 1 to 6 carbon atoms such as, for example, a methyl, ethyl, propyl, butyl, pentyl or hexyl group, or a corresponding alkoxy group. The term "aryl" designates a phenyl group or a phenyl group substituted by one or more alkyl, alkoxy, or halo groups. The term "aryloxy" designates a corresponding phenoxy or a corresponding substituted phenoxy group.

A preferred group of compounds comprises those in which X represents a carbon chain of 2 to 4 members in which a CO or CHOH group is present, and R represents a lower alkyl group or a phenyl group, the latter being unsubstituted or substituted with a fluoro or a lower alkoxy group. Preferably, these compounds do not bear oxygen functionality at positions 1 and 4, i.e., the groups Y and Z both represent $H_2$.

The compounds of this invention have useful biological activities, in particular, strong tranquilizing and hypotensive activities.

DESCRIPTION OF SOME PREFERRED EMBODIMENTS

The general reaction sequence leading to a 2-substituted -1,2,3,4,6,7,12,12a-octahydropyrazino[2',1':6,1]-pyrido[3,4-b]indole is as follows:

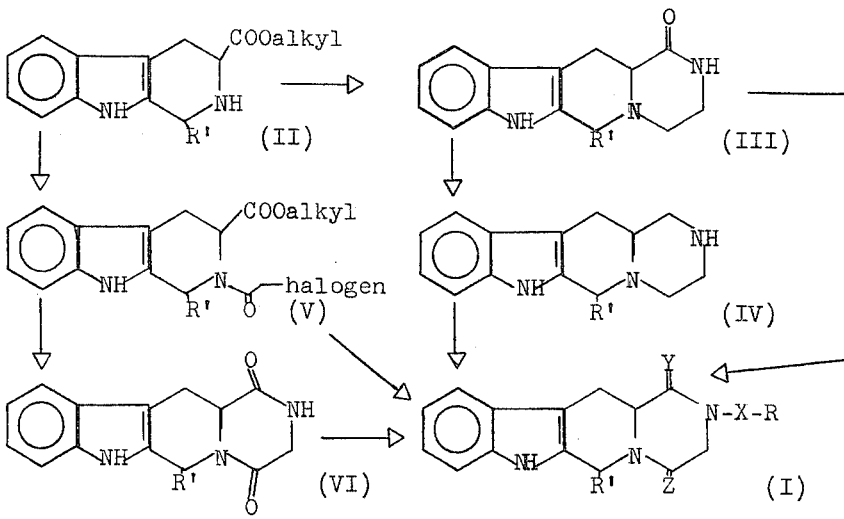

It will be noted that according to the foregoing scheme, there are two general methods leading to the synthesis of compounds corresponding to formula (I). In both methods, the starting material is an alkyl 1,2,3,4-tetrahydro-9H-pyrido[3,4-b]indole-3-carboxylate (II), prepared by the condensation of tryptophan with different aldehydes through methods described in the literature.

By the first general method, the alkyl 1,2,3,4-tetrahydro-9H-pyrido[3,4-b]indole-3-carboxylate is condensed with ethyleneimine in a polar solvent such as, for example, methanol, ethanol or butanol, preferably in the presence of an acid catalyst, such as hydrochloric acid to give a 1-oxo-1,2,3,4,6,7,12,12a-octahydropyrazino[2',1':6,1]-pyrido[3,4-b]indole of the formula (III). If compounds of the formula (I) in which Y and Z are both $H_2$ are desired as the end compound, lithium aluminum hydride reduction of (III) in a nonpolar aprotic solvent such as, for example, ether, diglyme, tetrahydrofuran or dioxane at a temperature varying from about 40° to about 100°C. gives a 1,2,3,4,6,-7,12,12a-octahydropyrazino[2',1':6,1-]pyrido[3,4-b]indole (IV). Substituents are then introduced at the 2-position of (III) or (IV) by a variety of methods.

By way of example, reaction between a 1,2,3,4,6,7,12,12a-octahydropyrazino[2',1':6,1-]pyrido-[3,4-b]indole (IV) with a reagent of the structure R—X—halo (where R—X has the same meaning as described above and halo is either chloro or bromo) gives a 2-substituted 1,2,3,4,6,7,12,12a-octahydropyrazino[2',1':6,1]pyrido-[3,4-b]indole (I), where Y and Z are both $H_2$. This reaction is carried out in a solvent such as, for example, acetone, methyl ethyl ketone, tetrahydrofuran or dimethylformamide in the presence of a base such as, for example, triethylamine, pyridine, sodium or potassium carbonate. Sodium iodide optionally can be included in the reaction mixture to improve the yield of (I). When an amide of formula (I) is obtained, in which a carbonyl group is linked to the nitrogen atom at position 2 and Y and Z are $H_2$, on lithium aluminum hydride reduction in a solvent such as, for example, ether, tetrahydrofuran or diglyme at a temperature up to the boiling point of the solvent, a 2-substituted-1,2,3-4,6,7,12,12a-octahydropyrazino[2',1':6,1]pyrido[3,4-b]-indole (I) is obtained, where R and R' have the same meaning as described above, X is a straight or branched alkylene chain and Y and Z are $H_2$. The amide in which a carbonyl group is bound to the nitrogen atom at position 2 can also be obtained by reaction of a 1,2,3,4,6,7,12,12a-octahydropyrazino[-2',1':6,1]pyrido[3,4-b]indole (IV) with excess of an alkyl alkanoate (RCOO alkyl) at the boiling point of the reagent.

By the second method of synthesis, an alkyl 1,2,3,4-tetrahydro-9(H)pyrido[3,4-b]indole-3-carboxylate (II) is reacted with a haloacetyl halide to give an alkyl 2-haloacetyl-1,2,3,4-tetrahydro-9H-pyrido[3,4-b]indole-3-carboxylate (V). This reaction is best carried out by adding equimolecular proportions of chloroacetyl chloride in an aprotic solvent such as, for example, chloroform, benzene, toluene or ether and at a temperature up to the boiling point of the solvent.

An alkyl 2-chloroacetyl-1,2,3,4-tetrahydro-9H-pyrido[3,4-b]indole-3-carboxylate (V) obtained as above is then condensed with a primary amine of the structure $H_2N$—X-R (wherein R and X have the same meaning as described above) in an alcoholic solvent such as ethoxy ethanol and at a temperature varying from about 100° to about 130°C. to give a 2-substituted 1,4-dioxo-1,2,3,4,6,7,12,12a-octahydropyrazino[2',1':6,1]pyrido[3,4-b]indole (I), wherein Y and Z = oxygen. If ammonia is used instead of a primary amine, the compound (VI) above is obtained, into which substituents at position 2 can be introduced, if desired after hydrogenation of the two oxo groups, according to the procedure already indicated for progressing from a compound (III) or (IV) above to a compound (I).

A 2-substituted-1,2,3,4,6,7,12,12a-octahydropyrazino[2',1':6,1]pyrido[3,4-b]indole (I) in free base form can, if desired, be converted into its nontoxic pharmaceutically-acceptable acid addition or quaternary ammonium salt. Salts which may be formed comprise, for example, salts with inorganic acids such as, for example, the hydrochloride, hydrobromide, hydroiodide, sulfate or phosphate, as well as salts with organic acids including monobasic acids such as, for example, the acetate or propionate and especially salts with hydroxy organic acids and dibasic acids such as, for example, the citrate, tartrate, malate and maleate. Among useful quaternary ammonium salts are those formed with such alkyl halides as, for example, methyl iodide and n-hexyl bromide.

It will be apparent to those skilled in the art that if racemic tryptophan is used for preparing the starting compound (II), the end compound (I) will also be a racemate, like all other intermediates prepared in the course of the synthesis. On the other hand, if natural L-tryptophan is used, all subsequent intermediates as well as the end compounds may retain the steric configuration and be present in the form of the L-isomer. In fact, the synthesis of compound (IV) above is stereospecific, since starting from L-tryptophan an optically active compound (III) is obtained, and the tetracyclic base (IV) derived from (III) is also optically active. The chiral centre 12a in the L-isomer of compound (III) and in the L-isomer of compound (IV) has S-configuration as present in L-tryptophan.

The following examples further describe the invention and manner and process of making and using it to enable the art skilled to make and use the same, and set forth the best modes contemplated by the inventors of carrying out the invention.

EXAMPLE 1:

1-Oxo-1,2,3,4,6,7,12,12a-octahydropyrazino-[2',1':6,1]pyrido [3,4-b indole

Ethyleneimine (2.5 ml) is added to a solution of methyl-1,2,3,4-tetrahydro-9H-pyrido[3,4-b]indole-3-carboxylate (12.4 g) and the hydrochloride salt of the latter (0.0124g) in absolute ethanol (125 ml) and refluxed for 24 hours. Then another aliquot of ethyleneimine (2.5 ml) is added and refluxing continued for another 24 hours. Concentration of the reaction mixture gives the product, which is recrystallized from absolute ethanol; yield 8.0 g., m.p. 260°–261°C.

EXAMPLE 2:

1,2,3,4,6,7,12,12a-Octahydropyrazino[2',1':6,1]-pyrido[3,4-b]indole

A mixture of 1-oxo-1,2,3,4,6,7,12,12a-octahydropyrazino[2',1':6,1]pyrido[3,4-b]indole (6.0 g) and lithium aluminum hydride (12.0 g) in tetrahydrofuran (450 ml) is refluxed for 48 hours, cooled and the complex decomposed by successive addition of water, aqueous 10% sodium hydroxide solution and water, filtered and the filtrate concentrated to give the product; yield 4.2 g., m.p. 230°–232°C.

EXAMPLE 3:

2-ν-(p-Fluorobenzoylpropyl)1,2,3,4,6,7,12,12a-octahydropyrazino[2',1':6,1]pyrido[3,4-b]-indole A mixture of 1,2,3,4,6,7,12,12a-octahydropyrazino-[2',1':6,1]pyrido[3,4-b]indole (2. g), λ-chloro-p-fluorobutyrophenone (2.54 g), anhydrous sodium carbonate (0.94 g) and dry sodium iodide (0.48 g) in dry dimethylformamide (40 ml) is stirred at 80°C. for 36 hours. The reaction mixture is diluted with water (100 ml) and extracted with benzene. The benzene extract is dried over anhydrous sodium sulfate, evaporated and the residue crystallized from benzene-hexane to give the product; yield 2.2 g., m.p. 188°–189°C.

EXAMPLE 4:

2-β-Diethylaminoethyl-1,2,3,4,6,7,12,12a-octahydropyrazino[2',1':6,1]pyrido[3,4-b]indole Obtained by a procedure similar to that described in Example 3; m.p. 98°–99°C.

EXAMPLE 5:

2-Methyl-1,2,3,4,6,7,12,12a-octahydropyrazino[2',1':6,1]pyrido[3,4-b]indole

A mixture of 1,2,3,4,6,7,12,12a-octahydropyrazino-[2',1':6,1]pyrido[3,4-b]indole (2.25 g) and ethyl formate (15 ml) is refluxed for 60 hours. The reaction mixture is evaporated and the residue crystallized from benzene-hexane to give 1,2,3,4,6,7,12,12a-octahydropyrazino[2',1':6,1]-pyrido[3,4-b]indole. Yield 2.2 g., m.p. 118°–121°C. The obtained formyl compound (1.3 g) in dry tetrahydrofuran (10 ml) is added under stirring to lithium aluminum hydride (1.5 g) in tetrahydrofuran (20 ml). The reaction mixture is stirred and refluxed for 24 hours and worked up as described in Example 2 to give the product; yield 0.85 g., m.p. 227°–229°C.

EXAMPLE 6:

2-Phenylacetyl-1,2,3,4,6,7,12,12a-octahydropyrazino[2',1':6,1]pyrido[3,4-b]indole Phenylacetyl chloride (0.53 ml) in dimethylformamide (5 ml) is added with stirring to a solution of 1,2,3,4,6,7,12,12a-octahydropyrazino[2',1':6,1-]pyrido[3,4-b]-indole (1.14 g) and dry pyridine (0.6 ml) in dimethyl formamide (25 ml). The reaction mixture is stirred for 24 hours, and diluted with water, whereupon the product separates as an oil and slowly crystallizes on keeping for 12 hours at 25°C.; yield 0.8 g, m.p. 198°–200°C.

EXAMPLE 7:

2-Phenethyl-1,2,3,4,6,7,12,12a-octahydropyrazino[-2',1':6,1]pyrido[3,4-b]indole

The product of Example 6 is reduced with lithium aluminum hydride in tetrahydrofuran by the method as described in Example 2, to give the titular product; yield 0.5 g, m.p. 207°–208°C.

EXAMPLE 8:

2-β-Diethylaminoethyl-1,4-dioxo-1,2,3,4,6,7,12,12a-octahydropyrazino[2',1':6,1]pyrido[3,4-b]-indole A solution of chloroacetyl chloride (1.5 ml) in chloroform (10 ml) is gradually added in about 40 minutes to a solution of methyl 1,2,3,4-tetrahydro-9H-pyrido[3,4-b]-indole-3-carboxylate in dry chloroform (20 ml) under stirring. The reaction mixture is stirred and refluxed for 6 hours. Methanol (2 ml) is added, the solvent is evaporated in vacuum and the residue crystallized from benzene-heptane to give methyl 2-chloroacetyl-1,2,3,4-tetrahydro-9H-pyrido-[3,4-b]indole-3-carboxylate compound; yield 0.92 g., m.p. 175°–176°C. A solution of the so-obtained ester (0.81 g.), β-diethylaminoethylamine (0.37 g) in dry cellosolve (20 ml) is refluxed for 13 hours. The solvent is removed in vacuo and the residue chromatographed on silica gel in chloroform. Elution with chloroform gives the title compound which when recrystallized from chloroform-ethyl ether, gives a yield of 0.46 g., m.p. 143°–145°C.

EXAMPLE 9:

2-β-(4-Pyridyl)ethyl-1,2,3,4,6,7,12,12a-octahydropyrazino[2',1':6,1]pyrido[3,4-b]indole A solution of 11.55 g. of 4-vinylpyridine, 6 g. of acetic acid and 22.7 g. of 1,2,3,4,6,7,12,12a-octahydropyrazino[2',1':6,1]pyrido[3,4-b]indole in 1500 ml. of ethanol is refluxed for 20 hours, then the reaction mixture is evaporated to dryness. The residue is taken up in water (200 ml.) and made alkaline with 2N NaOH to give the titular compound.

EXAMPLES 10 to 18:

By substantially the same procedure as in Example 3, the following compounds of formula (I) in which Y and Z are both H₂ and R'is H are prepared:

| | X | R | m.p. °C. |
|---|---|---|---|
| 10. | CH₂CH₂CO | p—FC₆H₄ | 215–216 |
| 11. | CH₂CO | p—FC₆H₄ | 235 |
| 12. | CH₂CH₂CH₂CH₂CO | p—FC₆H₄ | 150–151 |
| 13. | CH₂CH₂CH₂CH₂CO | C₆H₅ | 144–146 |
| 14. | CH₂CH₂CH₂CO | C₆H₅ | 165–166 |
| 15. | CH₂CH₂CH₂CO | p—BrC₆H₄ | 200 |
| 16. | CH₂CH₂CH₂CO | p—CH₃OC₆H₄ | 161–163 |
| 17. | CH₃CH₃CH₃CO | p—CH₃C₆H₄ | 176 |
| 18. | CH₂ | 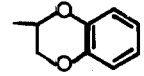 | 118 |

EXAMPLE 19:

2-(2-Phenyl-2-hydroxyethyl)-1,2,3,4,6,7,12,12a-octahydropyrazino[2',1':6,1]pyrido[3,4-b]-indole A mixture of 2.27 g. of the compound of Example 2 and 1.44 g. of 1-phenylethylene epoxide in 300 ml. of anhydrous ethanol is refluxed for 12 hours. The reaction mixture is then evaporated to dryness giving the product. M.p. 223°C. (from ethanol).

EXAMPLE 20:

2-(2-Phenoxy-2-hydroxyethyl)-1,2,3,4,6,7,12,12a-octahydropyrazino[2',1':6,1]pyrido[3,4-b]-indole The titular compound is prepared pursuant to the procedure of the foregoing example; m.p. 180°–182°C. (from ethanol).

EXAMPLE 21:

2-[4-(p-Fluorophenyl)-4-hydroxybutyl]-1,2,3,4,6,7,12,12a-octahydropyrazino[2',1':6,1]-pyrido[3,4-b ]indole pyrido[

To a stirred solution of 11 g. of the compound of Example 3 in 500 ml. of methanol, 0.75 g. of NaBH₄ is added slowly, and stirring is continued for 14 hours at 30°C. The reaction mixture is evaporated to dryness and the residue is triturated with water to give the titular compound; m.p. 138°–140°C. (from ethanol). The corresponding 4-acetoxybutyl analogue has an m.p. of 114°C. (from benzene/hexane).

EXAMPLE 22:

2-(3-Hydroxybutyl)-1,2,3,4,6,7,12,12a-octahydropyrazino[2',1':6,1]pyrido]3,4-b]indole The titular compound is prepared by the method described in the foregoing example. The m.p. is 193°C.; the corresponding 3-acetoxybutyl analogue has an m.p. of 154°–156°C.

EXAMPLES 23 TO 25:

2-Substituted-1,2,3,4,6,7,12,12a-octahydropyrazino[-2',1':6,1]pyrido[3,4-b]-indole To a stirred solution of the compound of Example 2 (2.27 g.) in anhydrous dimethylformamide (500 ml.), 0.7 g. of methyl vinyl ketone is added, and stirring is continued for 24 hours at 30°C. The reaction mixture is poured into water and the product having a 3-oxobutyl group at position 2 is recovered by filtration; m.p. 141°C. By exactly the same process, but using as starting compounds ethyl vinyl ketone and butyl vinyl ketone respectively, the analogs having at position 2 a 5-membered and a 7-membered carbon chain are prepared. The melting points are 161°C. and 137°C. respectively.

EXAMPLE 26:

2-(2-Cyanoethyl)-1,2,3,4,6,7,12,12a-octahydropyrazino[2',1':6,19 pyrido[3,4-b]indole A mixture of the compound of Example 2 and of acrylonitrile in considerable excess is refluxed for 30 hours, then it is cooled to give the desired product; m.p. 206°C.

EXAMPLE 27:

2-(2-Carbethoxyethyl)-1,2,3,4,6,7,12,12a-octahydropyrazino[2',1':6,1]pyrido[3,4-b]indole The titular compound is prepared like the compound of the preceding example, using ethyl acrylate instead of acrylonitrile; m.p. 125°C. When hydrolyzed with NaOH in water/ethanol, the compound gives the free carboxylic acid; m.p. 235°C.

EXAMPLE 28:

2-(3-Phenyl-3-hydroxybutyl)-1,2,3,4,6,7,12,12a-octahydropyrazino[2',1':6,1]pyrido[3,4-b]indole Prepared via a Grignard reaction from the compound of Example 23 and phenyl magnesium bromide; m.p. 164°C. (from ethyl acetate).

EXAMPLE 29:

2-(3-Hydroxypropyl)-1,2,3,4,6,7,12,12a-octahydropyrazino[2',1':6,1]pyrido[3,4-b]indole A solution of 3.27 g. of the compound of Example 27 in 200 ml. of tetrahydrofuran is added to a stirred suspension of 1.52 g. of $LiAlH_4$ in 50 ml. of ethyl ether. The reaction mixture is heated at 50°–55°C. for 4 hours and then worked up as usual in this kind of hydrogenation to give the titular product; m.p. 165°C.

EXAMPLE 30:

cis-1-Oxo-6-methyl-1,2,3,4,6,7,12,12a-octahydropyrazino[2',1':6,1]pyrido[3,4-b]indole Ethyleneimine (5.6 ml) in 400 ml. of anhydrous ethanol is added slowly to a stirred and refluxing solution of a mixture of 27.9 g. of methyl cis-1-methyl-1,2,3,-4-tetrahydropyrido[3,4-b]indole-3-carboxylate and 0.31 g. of the hydrochloride of the same methyl ester. Heating and stirring are continued for 24 hours, then the reaction mixture is evaporated to dryness. The residue is chromatographed on a basic $Al_2O_3$ column (500 g) previously set in hexane. Elution with benzene gives some starting material, and with ethyl acetate/benzene and ethyl acetate gives 6 g. of the titular compound, m.p. 208°C.

EXAMPLE 31:

cis-6-Methyl-1,2,3,4,6,7,12,12a-octahydropyrazino[-2',1':6,1]pyrido[3,4-b]indole The compound of Example 30 (5 g.) is hydrogenated with lithium aluminum hydride (b 4.75 g.) in 500 ml. of tetrahydrofuran at reflux for 48 hours. After cooling, the resulting complex is decomposed by the successive addition of water, aqueous 10% NaOH and $H_2O$, filtered and the filtrate on concentration and crystallization from aqueous tetrahydrofuran gives 4.6 g. of the titular compound, m.p. 186°–188°C.

EXAMPLE 32:

2-ν-(p-Fluorobenzoylpropyl)-6-methyl-1,2,3,4,6,7,12,12a-octahydropyrazino[2',1':6,1-]pyrido-[3,4-b]indole To a stirred mixture of 10.6 g. of the compound of the foregoing example, 4.25 g. of freshly baked $Na_2CO_3$ and 2.4 g. of sodium iodide in 150 ml. of dimethylformamide, 14 g. of p-fluoro-ν-chlorobutyrophenone are added and stirring is continued at 80°C. for 24 hours. The reaction mixture is poured into water and extracted with benzene. After evaporation of the solvent in vacuo the residue is crystallized from benzene/hexane to give the titular compound; m.p. 85°C.

EXAMPLE 33:

2-(3-Oxobutyl)-6-methyl-1,2,3,4,6,7,12,12a-octahydropyrazino[2',1':6,1]pyrido[3,4-b]-indole The compound is prepared pursuant to the procedure desccribed in Example 23; m.p. 97°C.

EXAMPLE 34:

2-β-(4-Pyridyl)ethyl-6-methyl-1,2,3,4,6,7,12,12a-octahydropyrazino[2',1':6,1]pyrido[3,4-b]-indole The compound is prepared pursuant to the procedure of Example 9 from the analogous 6-methyl starting compound. Its m.p. is 216°–218°C.

The compounds of the invention show a marked depressant activity, as shown, for instance, by the following pharmacological data, obtained by subjecting to animal tests the compound 2-ν-(p-fluorobenzoylpropyl)-1,2,3,4,6,7,12,12a-octahydropyrazino[2',1':6,1-]pyrido[3,4-b]indole.

Acute Toxicity:
  a. Mice $LD_{50}$ 180 mg/kg i.p. > 1 g/kg p.o.
  b. Rat $LD_{50}$ 700 mg/kg p.o.

Gross Effects: Sedation, reduced spontaneous motor activity, eye closure observed at 2.5 – 35 mg/kg i.p. doses in mice. There is, however, no marked hypothermia at these dose levels.

CNS Effects: Were tested in groups of 5 animals each, unless indicated otherwise. All tests were done one hour after drug administration.
  a. Amphetamine hyperactivity test (mice): $ED_{50}$ 0.5 mg/kg i.p.
  b. Amphetamine toxicity test in mice: $ED_{50}$ 2.9 mg/kg i.p.
  c. Effect on conditioned avoidance response in rat: $ED_{50}$ 0.16 mg/kg i.p. 0.25 mg/kg p.o.
  d. Rotard test (mice): $ED_{50}$ 5.9 mg/kg i.p.
  e. Effect on pentobarbitone sleeping time (mice). 100 % prolongation in sleeping time at 0.5 mg/kg i.p.
  f. Effect in monkey:
    i. Intraperitoneal: Doses of 0.6, 0.9, 1.25 and 2.5 mg/kg i.p. were given to groups of 4 aggressive monkeys each. The compound exhibited progressive CNS depression with increasing doses manifested by quietness, reduction in aggressiveness, animal sitting in one corner of the cage and ptosis. The effects started between 2 and 4 hours after dosage and lasted about 48 hours.
    ii. Oral: Doses of 0.25, 0.5 and 1.5 mg/kg were administered to groups of 4 monkeys each and 1, 2.5 and 5 mg/kg to groups of 2 monkeys each. At doses of 0.25 to 2.5 mg/kg, quietness, sedation, ptosis and reduced aggressiveness were observed. There was no catalepsy and animals were eating well. At 5 mg/kg, there was in addition catalepsy and reduced food intake. The effects cam about 2 hours after drug administration and persisted for about 48 hours.

g. Effect in cat: Doses of 1,2 and 5 mg/kg i.p. given to 2 cats each produced signs of CNS depression, e.g., sedation, ptosis and reduction in aggression. The effects appeared after 1 to 2 hours and lasted 24 hours.

h. Anti-emetic activity: Was studied in dogs in groups of 4 each. Emesis was induced by intravenous injection of apomorphine, 50 μg/kg. The compound produced 100% protection up to a dose of 125 μg/kg i.p.

i. EEG: A dose of 2 mg/kg i.v. in the cat produced abolition of reticular arousal.

j. Anticonvulsant activity: The compound did not afford protection against seizures induced by supra maximal electroshock (48 mA × 0.2 sec), metrazol 80 mg/kg subcutaneously or strychnine 1.5 mg/kg i.p. in mice.

k. Antireserpine activity (mice): The compound was devoid of MAO inhibitor activity at 30 mg/kg i.p.

Cardiovascular effect (cat):

Cats were anesthetised with pentobarbitone (30 mg/kg i.p.). The compound produced no significant effect on blood pressure or respiration at doses ranging from 1 to 10 mg/kg i.v. The pressor responses to noradrenaline and carotid occlusion were also not modified.

Isolated guinea pig ileum:

There was no effect up to a concentration of 5 × 10⁻³ mg/ml. Higher concentrations antagonised histamine-induced contractions.

Comparable pharmacological results were obtained with representative other compounds of this invention.

What is claimed is:

1. A compound which is a member of the group consisting of 2-ν-(p-fluorobenzoylpropyl)-1,2,3,4,6,7,12,12a-octahydropyrazino[2',1':6,1-]pyrido[3,4-b]indole; 2-ν-benzoylpropyl-1,2,3,4,6,7,12,12a-octahydropyrazino-[2',1':6,1]pyrido [3,4-b]indole; 2-β-(p-fluorobenzoylethyl)-1,2,3,4,6,7,12,12a-octahydropyrazino[2',1':6,1-]pyrido-[3,4-b]indole; b 2-ν-(p-methoxybenzoylpropyl)-1,2,3,4,6,7,12,12a-octahydropyrazino[2',1':6,1]pyrido[3,4-b]indole; 2-ν-(p-fluorobenzoylpropyl)-6-methyl-1,2,3,4,6,7,12,12a-octahydropyrazino[2',1':6,1]pyrido[3,4-b]indole; 2-(3-oxobutyl)-1,2,3,4,6,7,12,12a-octahydropyrazino[2',1':6,1-]pyrido [3,4-b]indole and 2-(3-oxobutyl)-6-methyl-1,2,3,4,6,7,12,12a-octahydropyrazino[2',1':6,1-]pyrido[3,4-b]indole.

2. The compound of claim 1 which is 2-ν-(p-fluorobenzoylpropyl)-1,2,3,4,6,7,12,12a-octahydropyrazino[2',1':6,1]pyrido[3,4-b]indole.

3. The compound of claim 1 which is 2-ν-benzoylpropyl-1,2,3,4,6,7,12,12a-octahydropyrazino[2',1':6,1-]pyrido-[3,4-b]indole.

4. The compound of claim 1 which is 2-β-(p-fluorobenzoylethyl)-1,2,3,4,6,7,12,12a-octahydropyrazino[2',1':6,1]pyrido[3,4-b]indole.

5. The compound of claim 1 which is 2-ν-(p-methoxybenzoylpropyl)-1,2,3,4,6,7,12,12a-octahydropyrazino[2',1':6,1]pyrido[3,4-b]indole.

6. The compound of claim 1 which is 2-(3-oxobutyl)-1,2,3,4,6,7,12,12a-octahydropyrazino[2',1':6,1-]pyrido-[3,4-b]indole.

7. The compound of claim 1 which is 2-(3-oxobutyl)-6-methyl-1,2,3,4,6,7,12,12a-octahydropyrazino[2',1':6,1]-pyrido[3,4-b]indole.

8. The compound of claim 1 which is 2-ν-(p-fluorobenzoylpropyl)-6-methyl-1,2,3,4,6,7,12,12a-octahydropyrazino[2',1':6,1]pyrido[3,4-b]indole.

* * * * *

UNITED STATES PATENT AND TRADEMARK OFFICE
CERTIFICATE OF CORRECTION

PATENT NO. : 3,917,599

DATED : November 4, 1975

INVENTOR(S) : Anil Kumar Saxena; Padam Chand Jain; Gurbuksh Singh; Prithvi Raj Dua; Rikhab Chand Srimal; Bhola Nath Dhawan; Nitya Anand It is certified that error appears in the above-identified patent and that said Letters Patent are hereby corrected as shown below:

On the first page, line [21], "346,468" should read --346,408--

Column 1, line 40, "Co" should read --CO--;

Column 1, line 66, after "or" insert --a--;

Column 2, line 51, the line should read --1,2,3,4,6,7,12,12a-octahydropyrazino[2',1':6,1- --;

Column 3, line 3, the line should read --substituted-1,2,3,4,6,7,12,12a-octahydropyrazino[2',- --;

Column 4, line 14 "[3,4-b indole" should read --[3,4-b]indole--;

Column 4, line 40, "2-ν-" should read -- 2-γ- --;

Column 4, line 44, "λ-chloro-p-" should read --γ-chloro-p- --;

Column 6, line 35, delete "pyrido[" at the end of the line;

Column 6, line 49, "pyrido]3,4-b]indole" should read --pyrido[3,4-b]indole--;

Column 7, line 3, "[2',1':6,19 pyrido" should read --[2',1':6,1]pyrido--;

Column 7, line 45, "cis-1-methyl-1,2,3,-4-tet-" should read --cis-1-methyl-1,2,3,4-tet- --;

Column 7, line 61, "(b 4.75 g.) should read --(4.75 g.)--;

Column 8, line 2, "2-ν-" should read -- 2-γ- --;

UNITED STATES PATENT AND TRADEMARK OFFICE
CERTIFICATE OF CORRECTION

PATENT NO. : 3,917,599

DATED : November 4, 1975

INVENTOR(S) : Anil Kumar Saxena; Padam Chand Jain; Gurbuksh Singh Prithvi Raj Dua; Rikhab Chand Srimal; Bhola Nath Dhawan; Nitya Anand It is certified that error appears in the above-identified patent and that said Letters Patent are hereby corrected as shown below:

Column 8, line 10, "p-fluoro-ν-chlorobutyrophenone" should read --p-fluoro-γ-chlorobutyrophenone--;

Column 8, line 21, "desccribed" should read --described--;

Column 8, line 33, "2-ν-" should read -- 2-γ- --;

Column 8, line 53, delete the period "." at the end of the sentence and insert a colon --:--;

Column 9, line 5, "cam" should read --came--;

Column 10, line 2, "2-ν-" should read -- 2-γ- --;

Column 10, line 4, "2-ν-" should read -- 2-γ- --;

Column 10, line 8, delete "b";

Column 10, line 8, "2-ν-" should read -- 2-γ- --;

Column 10, line 10, "2-ν-" should read -- 2-γ- --;

Column 10, line 11, "-octahydropyr-" at the end of the line should read -- -octahydropyra- --;

Column 10, line 17, "2-ν-" should read -- 2-γ- --;

Column 10, line 20, "2-ν-" should read -- 2-γ- --;

Column 10, line 26, "2-ν-" should read -- 2-γ- --;

Column 10, line 36, "2-ν-" should read -- 2-γ- --.

Signed and Sealed this first Day of June 1976

[SEAL]

Attest:

RUTH C. MASON
Attesting Officer

C. MARSHALL DANN
Commissioner of Patents and Trademarks